US010981586B2

United States Patent
Martell et al.

(10) Patent No.: US 10,981,586 B2
(45) Date of Patent: Apr. 20, 2021

(54) RAILWAY DIAGNOSTIC SYSTEMS AND METHODS

(71) Applicant: HITACHI RAIL STS USA, INC., Pittsburgh, PA (US)

(72) Inventors: Andrew John Martell, Pittsburgh, PA (US); Jonathan R. Dylewski, Sewickley, PA (US); Jian Sun, Wexford, PA (US)

(73) Assignee: HITACHI RAIL STS USA, INC., Pittsburgh, PA (US)

( * ) Notice: Subject to any disclaimer, the term of this patent is extended or adjusted under 35 U.S.C. 154(b) by 0 days.

(21) Appl. No.: 16/562,732

(22) Filed: Sep. 6, 2019

(65) Prior Publication Data
US 2020/0079405 A1    Mar. 12, 2020

Related U.S. Application Data

(60) Provisional application No. 62/728,261, filed on Sep. 7, 2018.

(51) Int. Cl.
*B61L 27/00* (2006.01)
*G06F 16/26* (2019.01)
*G06F 16/22* (2019.01)
*G06N 20/00* (2019.01)

(52) U.S. Cl.
CPC ...... *B61L 27/0088* (2013.01); *G06F 16/2219* (2019.01); *G06F 16/26* (2019.01); *G06N 20/00* (2019.01)

(58) Field of Classification Search
CPC ............. B61L 27/0088; B61L 27/0094; B61L 27/0077; B61L 15/0081; B61L 25/00; G06F 16/26; G06F 16/2219; G06N 20/00
See application file for complete search history.

(56) References Cited

U.S. PATENT DOCUMENTS

| | | |
|---|---|---|
| 5,867,404 A | 2/1999 | Bryan |
| 8,543,774 B2 | 9/2013 | Lemonovich et al. |
| 2002/0169514 A1* | 11/2002 | Eryurek .......... G06Q 30/0633 700/110 |
| 2005/0234757 A1 | 10/2005 | Matheson et al. |
| 2010/0204857 A1 | 8/2010 | Forrest et al. |
| 2011/0210867 A1* | 9/2011 | Benedikt .......... G08G 1/096725 340/905 |
| 2015/0185090 A1 | 7/2015 | Groeneweg et al. |

(Continued)

OTHER PUBLICATIONS

Waldemar Nowakowski et al., Railway automation systems diagnosis based on Bayesian method, Jul. 1, 2018, IEEE Xplore, pp. 2089-2093 (Year: 2018).*

(Continued)

*Primary Examiner* — Tam T Tran
(74) *Attorney, Agent, or Firm* — Eckert Seamans Cherin & Mellott, LLC

(57) ABSTRACT

A railway diagnostic system includes a plurality of field objects, a plurality of controllers associated with field objects and being structured to gather data from the field objects and to communicate the data gathered from the field objects, a diagnostic server structured to receive the data gathered from the field objects from the controller, to store the data gathered from the field objects in a database, and to provide access to the database, and a client structured to use the diagnostic server to access the database.

19 Claims, 7 Drawing Sheets

(56) References Cited

U.S. PATENT DOCUMENTS

| | | |
|---|---|---|
| 2016/0221592 A1 | 8/2016 | Puttagunta et al. |
| 2017/0043799 A1* | 2/2017 | Shubs ................. B61L 27/0077 |
| 2017/0076511 A1* | 3/2017 | Busch-Sorensen .......................... G07C 5/0816 |
| 2017/0193140 A1* | 7/2017 | Brothers ............ G06K 9/00342 |
| 2018/0181095 A1* | 6/2018 | Funk ....................... H04L 67/12 |

OTHER PUBLICATIONS

Anastasiya A. Minina et al., Subsystem On-Board Information-Measuring System, Sep. 1, 2018, IEEE, pp. 248-252 (Year: 2018).*
USPTO, "International Search Report and Written Opinion", PCT/US19/049848, dated Nov. 12, 2019, 13 pp.

* cited by examiner

RAILWAY DIAGNOSTIC SYSTEMS AND METHODS

CROSS-REFERENCE TO RELATED APPLICATION

This application claims priority from U.S. Provisional Patent Application Ser. No. 62/728,261, filed Sep. 7, 2018, entitled "RAILWAY DIAGNOSTIC SYSTEMS AND METHODS", the contents of which are incorporated herein by reference.

BACKGROUND

Field

The disclosed concept relates generally to railway diagnostic systems and methods, and in particular, to centralized aggregation and display of railway diagnostic information.

Background Information

Railway systems include numerous components that are distributed over vast geographical distances. Switching and signaling equipment is generally controlled locally by a controller located in the area of the component that it controls. In a given railway system, there will be numerous such controllers that control the switching and signaling equipment. A controller is also able to gather diagnostic information about the equipment it is associated with or about the controller itself.

SUMMARY

In accordance with aspects of the disclosed concept, a railway diagnostic system comprises: a plurality of field objects; a plurality of controllers associated with field objects and being structured to gather data from the field objects and to communicate the data gathered from the field objects; a diagnostic server structured to receive the data gathered from the field objects from the controller, to store the data gathered from the field objects in a database, and to provide access to the database; and a client structured to use the diagnostic server to access the database.

In accordance with other aspects of the disclosed concept, a method of gathering and displaying or analyzing data in a railway diagnostic system comprises: gathering data from a plurality of field objects; storing the gathered data in a database; providing access to the database; accessing the data in the database; and displaying a representation of data accessed in the database.

In accordance with other aspects of the disclosed concept, a non-transitory computer readable medium storing one or more programs, including instructions, which when executed by a computer, causes the computer to perform a method of gathering and displaying or analyzing data in a railway diagnostic system is provided. The method comprises: gathering data from a plurality of field objects; storing the gathered data in a database; providing access to the database; accessing the data in the database; and displaying a representation of data accessed in the database.

DESCRIPTION OF THE PREFERRED EMBODIMENTS

Figure 1:
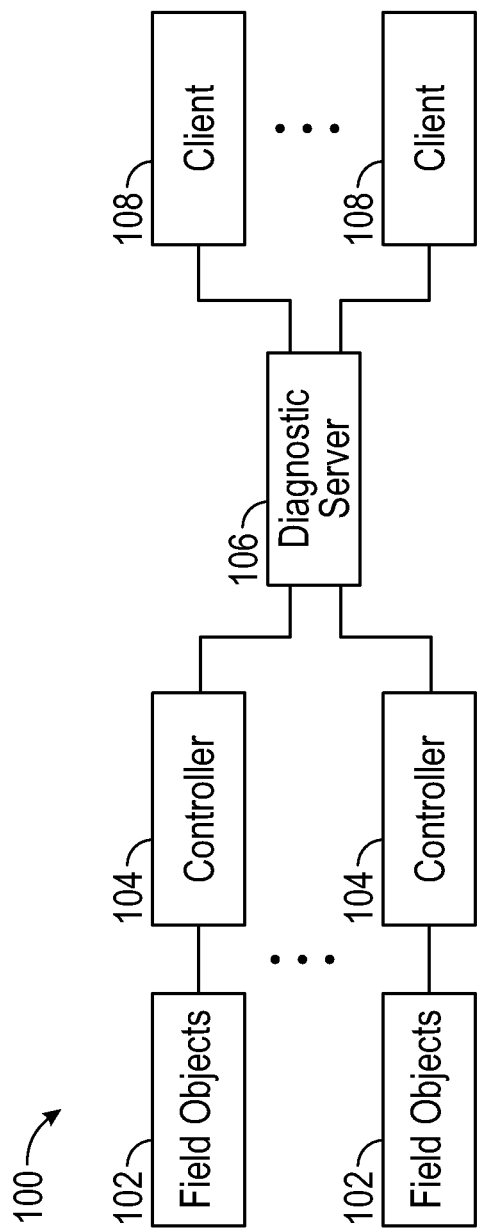
FIG. 1 is a schematic diagram of a railway diagnostic system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable device that can store, retrieve, and process data; a microprocessor; a microcontroller; a microcomputer; a central processing unit; or any suitable processing device or apparatus.

FIG. 1 is a schematic diagram of a railway diagnostic system 100 in accordance with an example embodiment of the disclosed concept. The railway diagnostic system in the example embodiment includes one or more field objects 102, one or more controllers 104, a diagnostic server 106, and one or more clients 108. However, it will be appreciated by those having ordinary skill in the art that components may be added or removed without departing from the scope of the disclosed concept.

The field objects 102 may be types of signaling or switching components utilized in a railway system. For example and without limitation, the field objects 102 may include components such as various types of signals disposed at various locations in a railway system and various types of switches, such as switches used to switch between rails in a railway system, or other types of switches. The field objects 102 may also include other types of components of a railway system. For example, the field objects 102 may include components to signal and control traffic, such as road signals and gates. The field objects 102 may also include components such as sensors used in the railway system to monitor the location and/or speed of trains using the railway system or other aspects of the railway system. While some examples of field objects 102 are provided, it will be appreciated by those having ordinary skill in the art that many other components associated with the functionality and operability of the railway system may also be field objects 102.

The controllers 104 are associated with the field objects 102 and provide control and monitoring of the field objects 102. For example and without limitation, when the field object 102 is a signal, the controller 102 may control the state of the signal as well as monitor the status of the signal. Similarly, for other types of field objects 102, the controller 104 may provide control and monitoring associated with the type of the field object 102. The controllers 104 may have a 1 to 1 association with a field object 102 or a 1 to many association with multiple field objects 102. For example and without limitation, a single controller 104 may provide control and monitoring of multiple field objects 102. For example, a single controller 104 may control and monitor multiple signals and switches or other types of field objects 102.

In some example embodiments, the controllers 104 are MICROLOK® devices. However, it will be appreciated that the disclosed concept is applicable to other types of controllers or devices that control and or monitor field objects 102 in a railway system.

The field objects 102 and controllers 104 may be distributed throughout the railway system. For example, the field objects 102 and controllers 104 may be located at various geographic locations throughout the railway system. In some example embodiments of the disclosed concept, a controller 104 may be located within the vicinity of the field objects 102 it is associated with. For example, a controller 104 that controls and monitors field objects 102 such as signals and switches may be located at or near the location where the signals and switches are located. In some example embodiments, a controller 104 associated with field objects 102 may be located at a railway station where the field objects 102 it is associated with are also located.

The controllers 104 are structured to communicate with the field objects 102 they are associated with. In some example embodiments, the controllers 104 are structured to communicate with the field objects 102 via a wired connection. The controllers 104 may communicate with the field objects 102 using any suitable communication protocol.

Figure 5:
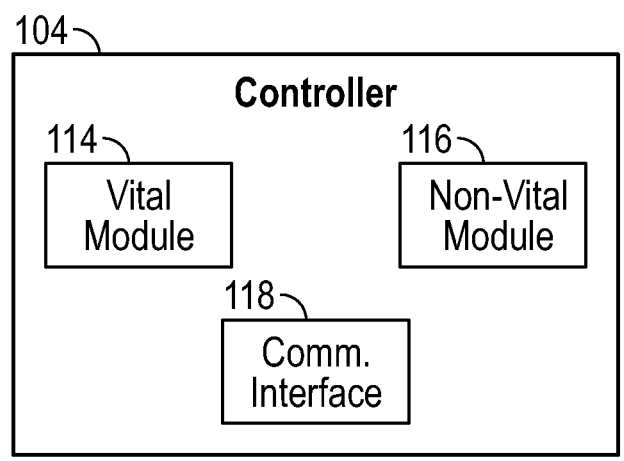
FIG. 5 is a schematic diagram of a controller in accordance with an example embodiment of the disclosed concept.

Referring to FIG. 5, a schematic diagram of a controller 104 in accordance with an example embodiment of the disclosed concept is shown. In the example embodiment, the controller 104 has a vital module 114, a non-vital module 116, and a communication interface 118. The controller 104 may have vital and non-vital functionality. For example and without limitation, the vital functionality may include controlling or controlling aspects of switching and signaling aspects of the field objects 102 where safety is related. The vital module 114 includes the components (e.g., without limitation, processor(s), memory, etc.) to implement the vital functionality of the controller 104. The non-vital functionality may include functionality that does not have safety implications. Some examples of non-vital functionality may include gathering and communicating diagnostic information about the field objects 102 or about the controller 104 itself. The non-vital module 116 includes the components (e.g., without limitation, processor(s), memory, etc.) to implement the non-vital functionality of the controller 104. The communication interface 118 is structured to facilitate communication between the controller 104 and the field objects 102, the diagnostic server 106, and any other devices that the controller 104 communicates with. The communication interface 118 may facilitate communication with other devices via one or more communication protocols such as any suitable serial communication protocol or ethernet based communication protocols. It will also be appreciated by those having ordinary skill in the art that the communication interface 118 may be incorporated in part or in whole into the vital module 114, the non-vital module 116, or both.

Referring back to FIG. 1, the diagnostic server 106 is structured to communicate with the controllers 104. The diagnostic server 106 may communicate with the controllers 104 via a network such as the internet or another communication network. In some example embodiments, the diagnostic server 106 is centralized. That is, the diagnostic server 106 may be located in a single location and communicate with the controllers 104 distributed across various geographic locations.

The controllers 104 are structured to communicate diagnostic and other types of information to the diagnostic server 106. The diagnostic information may include diagnostic information that the controllers 104 gather from their associated field objects 102. The diagnostic information may also include diagnostic information about the controllers 104 themselves. The controllers 104 may communicate any type of information that the controller 104 has to the diagnostic server 106. Some examples of types of information that the controllers 104 communicate may be bit update information, error log information, event log information, user log information, adjustment table information, board status information, link status information, station status information, and time update information. While some examples of types of information have been provided, it will be appreciated by those having ordinary skill in the art that the controllers 104 may communicate various other types of information without departing from the scope of the disclosed concept.

Figure 6:
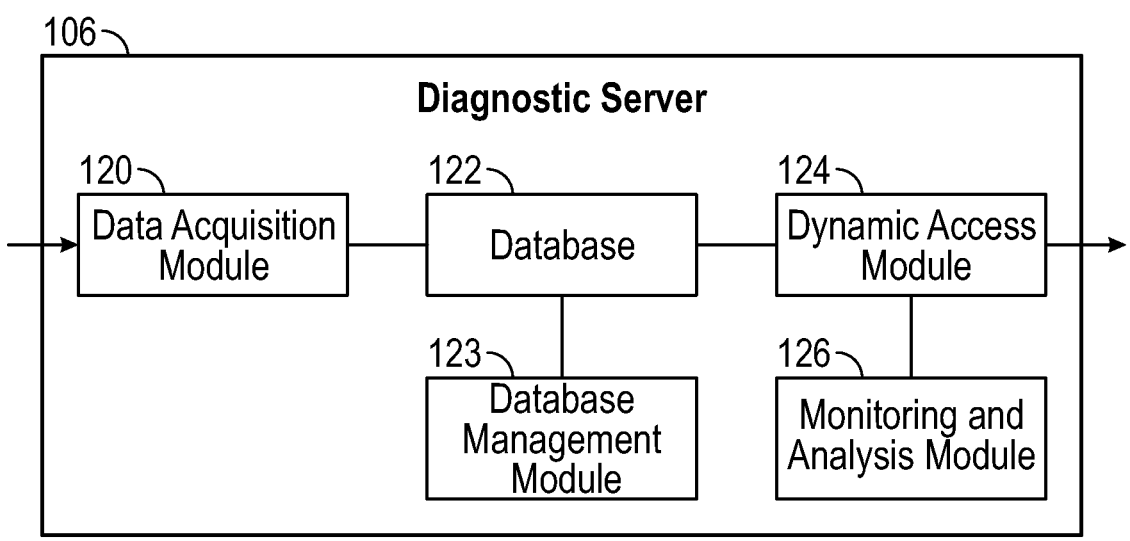
FIG. 6 is a schematic diagram of a diagnostic server in accordance with an example embodiment of the disclosed concept.

Referring to FIG. 6, a schematic diagram of a diagnostic server 106 in accordance with an example embodiment of the disclosed concept is shown. In the example embodiment, the diagnostic server 106 includes a data acquisition module 120, a database 122, a database management module 123, a dynamic access module 124, and a monitoring and analysis module 126. It will be appreciated by those having ordinary skill in the art that the components of the diagnostic server 106 may be spread across multiple devices. It will also be appreciated that each of the components themselves may be spread across multiple devices without departing from the scope of the disclosed concept.

The data acquisition module 120 is structured to acquire data from the controllers 104. The data acquisition module 120 may include hardware and software components to communicate with the controllers 104 and acquire data from the controllers 104. For example and without limitation, the data acquisition module 120 may include a process and associated memory including one or more routines which, when implemented by the processor, cause the processor to implement some or all of the functionality of the data acquisition module 120. It will be appreciated that the data acquisition module 120 may also include other types of hardware. It will also be appreciated that the data acquisition module 120 may share hardware or software elements with other components of the diagnostic server 106. For example, the data acquisition module 120 and the database 122, dynamic access module 124, and/or the monitoring and analysis module 126 may share the same processor in some example embodiments of the disclosed concept. The data acquisition module 120 may be structured to communicate with the controllers 104 via a network such as the internet or other communications networks.

In some example embodiments of the disclosed the data acquisition module 120 is structured to acquire data from associated controllers 104 according to a set schedule. However, it will be appreciated that the data acquisition module 120 may acquire the data at other intervals, upon request, or in real-time without departing from the scope of the disclosed concept. The data acquisition module 120 is structured to acquire data from multiple controllers 104. In some example embodiments, a single data acquisition module 120 is structured to acquire data from all controllers 104 in the system. In some other example embodiments, multiple data acquisition modules 120 may be used, each corresponding to an associated set of controllers 104 and being structured to acquire data from their associated set of controllers 104. The collected data from the data acquisition modules 120 may then be aggregated into the database 122. The data acquisition module 120 may be co-located with the other components of the diagnostic server 106. In some example embodiments, the data acquisition module 120 may be located separate from other components of the diagnostic server 106. In embodiments where multiple data acquisition modules 120 are used, the data acquisition modules 120 may be co-located or located separate from each other. For example, in some example embodiments, each data acquisition module 120 may be located at a station with the controllers 104 it is associated with.

Since the controllers 104 are distributed, their internal times may not maintain synchronization with each other. In some example embodiments, the data acquisition module 120 is structured to synchronize time with the controllers 104 it is associated with. In this manner, the controllers 104 will be synchronized with each other. With synchronized time, the time stamp associated with any data will be consistent with time stamps received from other controllers 104. Having accurate time stamp data across geographically dispersed controllers 104 can be useful when the aggregated data is analyzed.

The data acquisition module 120 is structured to communicate the data it acquires to the database 122. The database 122 includes memory and is structured to store data received from the data acquisition module 120. The database 122 is structured to store the data in an organized manner. For example, one or more data structures may be used to store the data such that the data may be sorted and retrieved in an efficient manner. The data may include identifier information regarding which controller 104 it came from, a time stamp, and/or a type of the data. The data structure used by the database 122 may include fields for the identifier information, time stamp, and/or type of data such that the data can be sorted and/or retrieved efficiently according to any of these criteria. It will be appreciated that any suitable type of data structures may be used by the database 122. It will also be appreciated that types of information included in the data may be different than the provided examples.

The database management module 123 is structured to manage the database 122. The database management module 123 includes hardware and software structured to manage the database 122. Managing the database 122 may include, for example, sorting data, placing data, rearranging data, or any other tasks related to maintaining the database 122. In some example embodiments, the database management module 123 may be incorporated into the database 122 or be considered to be part of the database 122. It will also be appreciated that the database management module 123 may be omitted or its functionality may be implemented by different components.

The dynamic access module 124 is structured to communicate with the database 122. The dynamic access module 124 is structured to provide access to data in the database 122 to other components such as the clients 108. The dynamic access module 124 may provide dynamic access to the data in the database 122. In some example embodiments, the dynamic access module 124 includes an extended markup language (XML) server that provides access to the data in the database 122. In some example embodiments, the dynamic access module 124 includes a simple network management protocol (SNMP) server that provides access to the data in the database 122. However, it will be appreciated that the dynamic access module 124 may provide access to the data in the database 122 using other protocols without departing from the scope of the disclosed concept. In some example embodiments, the dynamic access module 124 is self-organizing and self-structuring. For example, the dynamic access module 124 may generate a data structure based on the data it receives.

In some example embodiments, the diagnostic server 106 includes a monitoring and analysis module 126. The monitoring and analysis module 126 may be co-located with other components of the diagnostic server 106 or it may be located separately from the other components of the diagnostic server 106. In some example embodiments, the monitoring and analysis module 126 may be a separate device such as a stand-alone laptop or computer. However, it will be appreciated that the monitoring and analysis module 126 may share hardware with other components of the diagnostic server 106. For example, the monitoring and analysis module 126 may share a server rack with other components of the diagnostic server 106.

The monitoring and analysis module 126 is structured to access data in the database 122 using the dynamic access module 124. The monitoring and analysis module 126 is also structured to monitor and analyze the data in the database 122. The monitoring and analysis module 126 may be structured to monitor various criteria included in the data. For example, the monitoring and analysis module 126 may monitor data meeting a predetermined criteria and perform further action with respect to the data. In some example embodiments, the monitoring and analysis module 126 may generate a report of the data meeting the predetermined criteria. The monitoring and analysis module 126 may also output an alarm or other indication when the predetermined criteria are met. The monitoring and analysis module 126 may perform other types of monitoring and take other types of action as well without departing from the scope of the disclosed concept.

The monitoring and analysis module 126 is also structured to analyze data in the database 122. The monitoring and analysis module 126 may use various types of analysis without departing from the scope of the disclosed concept. In some example embodiments of the disclosed concept, the monitoring and analysis module 126 may use machine learning techniques such as, without limitation, neural networks or deep learning, to analyze data in the database 122. The data in the database 122 may include diagnostic data from various controllers 104 over a period of time. The data may include diagnostic information about the controllers 104 themselves and/or the field objects 102 they are associated with. By using machine learning techniques, patterns in the data can be recognized. For example, based on failures in field objects 102 over time, the analysis performed by the monitoring and analysis module 126 can predict the criteria or combination of criteria that are indicative that a field object 102 is about to fail or will require service. In some example embodiments, the monitoring and analysis module 126 may take action based on the analysis. For example, if the analysis indicates that a field object 102 is about to fail or will require service, the monitoring and analysis module 126 may automatically generate a work order to replace or service the field object 102. However, it will be appreciated that machine learning techniques are not limited to predicting failures of parts and that the monitoring and analysis module 126 may perform multiple types of analysis without departing from the scope of the disclosed concept.

By aggregating data from multiple controllers 104 to the database 122 and providing access to the data to the monitoring and analysis module 126, the monitoring and analysis module 126 has access to a wealth of data that can be used to improve the operation or design of railway systems. For example, analysis of the data may show that a railway system including field objects 102 arranged in one manner is less prone to failure than a railway system including field objects 102 arranged in another manner. It will be appreciated that any type of analysis may be performed on the data included in the database 122. The analysis may also be performed on any subset of the data. Having the data centrally located and accessible allow a wide variety of analysis to be performed. If the data were not able to be aggregated from the various controllers 104, the type of analysis that could be performed would be limited.

Figure 7:
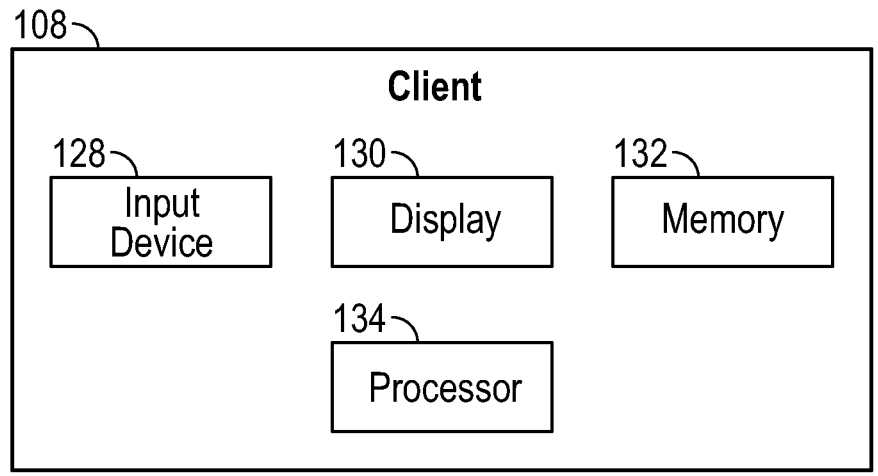
FIG. 7 is a schematic diagram of a client device in accordance with an example embodiment of the disclosed concept.

In addition to providing access to the data in the database 122 to the monitoring and analysis module 126, the dynamic access module 124 provides access to the data to the clients 108. The clients 108 may be various types of electronic devices. For example, the clients 108 may be laptop computers, desktop computers, tablets, mobile phones, or other types of electronic devices that can receive and display data. A schematic diagram of an example client 108 is shown in FIG. 7. As shown in FIG. 7, the client 108 includes an input device 128, a display 130, a memory 132, and a processor 134. The input device 128 may be any suitable type of input device 128 for receiving input from a user of the client 108. For example, keyboards, mice, and touchscreens are common types of input devices 128. It will be appreciated that other types of input devices may also be employed without departing from the scope of the disclosed concept. The display 130 may be any suitable type of display for displaying information or other types of graphics. One common type of display 130 is a liquid crystal device (LCD) screen. However, it will be appreciated that other types of displays 130 may be employed without departing from the disclosed concept. The process 134 may be structured to implement one or more routines stored in the memory 132 to implement the functionality of the client 108.

The client 108 may be structured to access data in the database 122 via the dynamic access module 124. The client 108 may also be structured to generate a user interface on which the data or a representation of the data is displayed. That is, the user interface, including the data or a representation thereof, may be displayed on the display 130 of the client 108. The user interface may be updated at a set schedule, on demand, or in real-time without departing from the scope of the disclosed concept.

Figure 8:
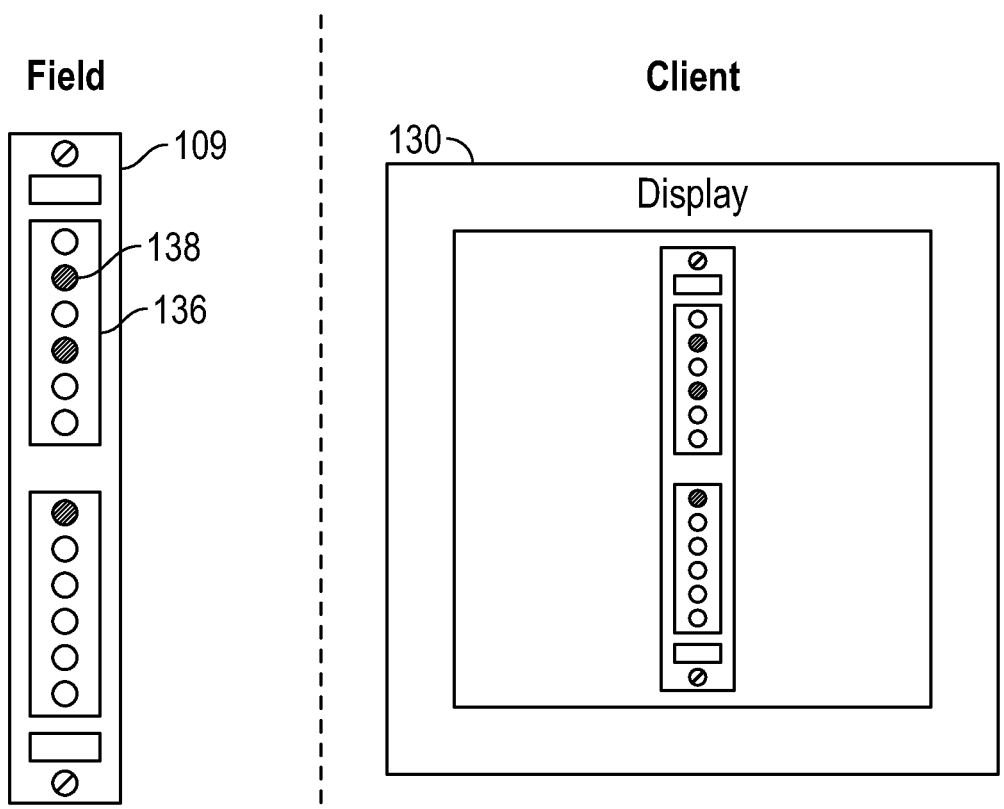
FIG. 8 is an illustration of a comparison of a controller and a client display in accordance with an example embodiment of the disclosed concept.

The data may be displayed on the user interface in text form, graphical form, or a combination thereof. In some example embodiments, a graphical representation of data is shown via display objects that emulate the visual look of the controllers 104 and/or field objects 102. Referring to FIG. 8, an example of a controller 104 in the field and the corresponding user interface displayed on the display 130 of a client 108 is shown. The controller 104 includes an indicator section including indicator lights 138. The indicator lights 138 represent various statuses or other information associated with the controller 104 based on which indicator lights 138 lights are illuminated. The user interface displayed on the display 130 includes a display object that visually emulates the look of the controller 104. The display object is updated based on the data the client 108 receives from the diagnostic server 106 such that the indicator lights that are illuminated on the display object are the same as the indicator lights 138 that are illuminated on the actual controller 104. In this manner, a user of the client 108 can use the client 108 to look at a representation of what the controller 104 presently looks like. The user can also use the client 108 to look at representations of any other controllers 104 included in the system. Rather than travelling to the various geographic locations where the controllers 104 are located, the user can view up to date graphical representations of the controllers 104 from a single location. As technicians may be trained to evaluate what the indicator lights 138 on the actual controller 104 mean, the technicians can use the client 108 to evaluate multiple different controllers 104 without the need for additional training to interpret the output of the client 108. While an example of displaying a representation of the controller 104 is described, it will also be appreciated that representations of various field objects 102 may also be employed. For example, the user interface may be configured to display display objects that represent various field objects and emulate the looks of the field objects 102. The display objects may be arranged similar to how the field objects 102 are arranged. The display objects may also be updated with data from the database 122 to reflect the status of the field objects 102. Creating a user interface that displays display objects that represent field objects 102 will be described in more detail with respect to FIGS. 9 and 10.

In some example embodiments of the disclosed concept, the diagnostic server 106 may be structured to provide data to the controllers 104 directly or via the data acquisition module 112. For example, rather than just providing data to the clients 108, data or analysis accumulated in the diagnostic server 106 may be provided to one or more of the controllers 104. In this manner data from one or multiple controllers 104 may be accumulated in the diagnostic server 106 and may be provided to the same or different ones of the controllers 104. The data may be used, for example, as part of feedback control or for other purposes.

Additionally, in some example embodiments, the diagnostic server 106 or other components may provide a playback function. For example, the diagnostic server 106 may provide historical data over a period of time to the client 108 such that a user can review the data, such as changes in status indicators or other data, over a desired period of time. Such analysis can be useful in monitoring various data during the time period of interest. For example, playback can be used to monitor various data in a period leading up to an event of interest in the system and can provide insight into what led to the event.

Figure 9:
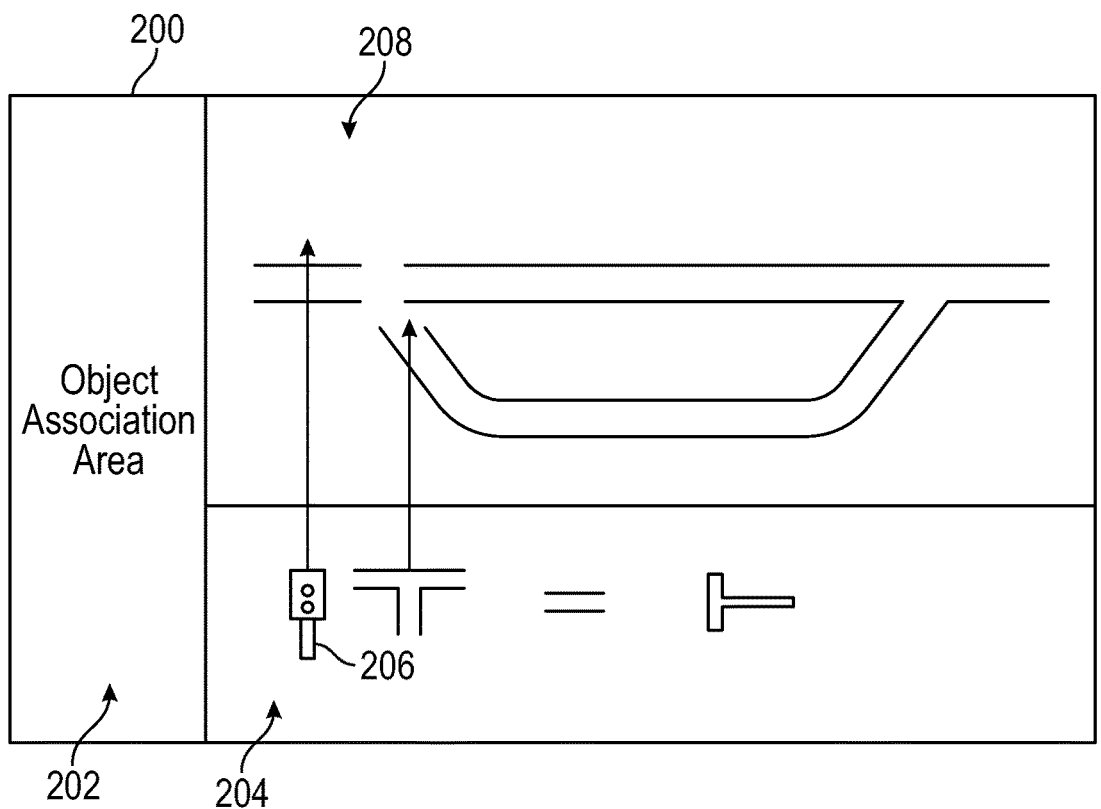
FIGS. 9 and 10 are illustrations of an interface designer in accordance with an example embodiment of the disclosed concept.
Figure 10:
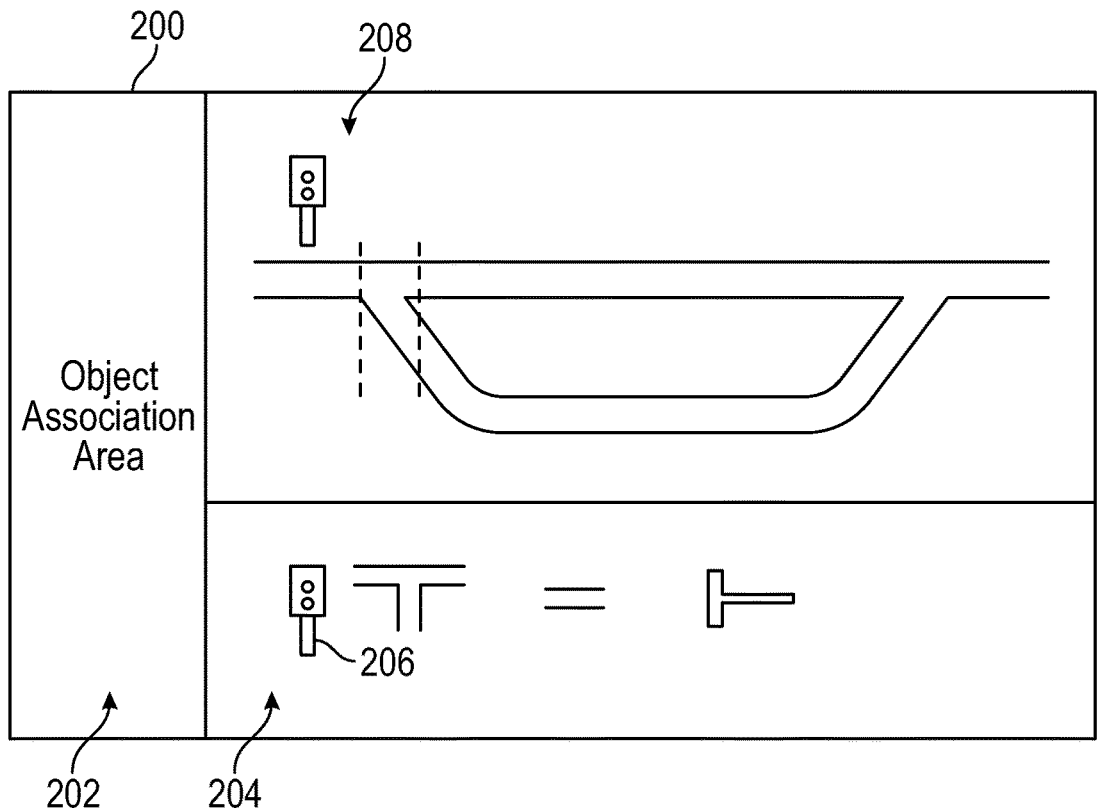

FIGS. 9 and 10 are an illustration of designing a user interface 200 in accordance with an example embodiment of the disclosed concept. As shown in FIG. 9, the user interface 200 includes a display object area 204, a display area 208, and an object association area 202. The display object area 204 is configured to display a variety of display objects 206 that may be designed to emulate the look of field objects 102 that they are associated with. For example, one display object may emulate the look of a signal while another display object may emulate the look of a switch.

The display area 208 is configured to display the display objects 206 once they are placed and arranged as desired. In some example embodiments, the display objects 206 may be moved to the display area 208 by clicking on them and dragging them to the desired area in the display area 208. However, it will be appreciated that any suitable method of selecting and moving the display objects 206 may be employed without departing from the scope of the disclosed concept.

The object association area 202 is used to associate the display objects 206 in the display area 208 with one or more pieces of data that are acquired from the database 122. For example, the object association area 202 may list various pieces of data that are available from the database 122. A user may select a display object 206 and select the pieces of data that will be associated with the display object 206. For example, in the case that the display object 206 represents a signal, the display object 206 may be associated with the status of a signal associated with a particular controller 104. Once the display object 206 is associated with the piece of data, the display object 206 may be updated based on the data being updated. In some example embodiments, the display object 206 may be updated to emulate the look of the field object 102 it is associated with based on the data being updated. For example, if the display object 206 is a switch, and the data the display object 206 is associated indicates that the switch in the field changes to show a particular color, the display object 206 may change to show that same particular color.

An example of a completed display area 208 is shown in FIG. 10. As shown in FIG. 10, the completed display area 208 may visually represent a railway system or a section of a railway system in accordance with some example embodiments of the disclosed concept. However, it will be appreciated that the types of visual representations that the user interface 200 may be designed to display is not limited thereto. It will be appreciated that users may customize the types of visual representations shown on the user interface to suit their preferences. It will be appreciated that the disclosed concept is versatile to support a wide variety of visual representations that can be shown on the user interface 200.

In some example embodiments, the user interface 200 may provide a design mode or a display only mode. The design mode is shown in FIGS. 9 and 10. In the design mode, display objects 206 can be added and removed from the display area 208 and their associations with data may be manipulated. In the display mode, modification of the display area 208 may not be allowed. Additionally, in the display mode, the display object area 204 and the object association area 202 may be hidden. Certain personnel may only be permitted to access the display mode so as to limit their access to data and/or their ability to modify the display area 208.

While graphical representation of the data in the database 122 has been described, it will also be appreciated that textual representation of the data may be provided. It will be appreciated that the textual representation may be provided via the user interface 200 or in other manners. For example and without limitation, the textual representation of the data may be provided via e-mail, text message, or other suitable manners. It will be appreciated that graphical representation of the data may be provided in such manners as well. In some example embodiments of the disclosed concept, some of the data may be analyzed and the results of the analysis may be provided to the client 108 for presentation to a user. For example, the monitoring and analysis module 126 may analyze the data and provide results of the analysis to the client 108.

It will be appreciated by those having ordinary skill in the art that the disclosed concept is versatile and can be used to monitor and display a wide variety of types of information associated with the controllers 104 and field objects 102 in a variety of manners that may be easily customized as a user desires. For example, a user may generate a user interface 200 that monitors the status of a few field objects 102 in a simple railway system. On the other hand, a user may generate a series of user interfaces 200 that monitor the various aspects of various parts of a complex railway systems as well as provides results of various analyses of aspects of the railway systems. The disclosed concept provides the framework for a user or various users to access and display data associated with the railway system suited to their needs.

Figure 11:
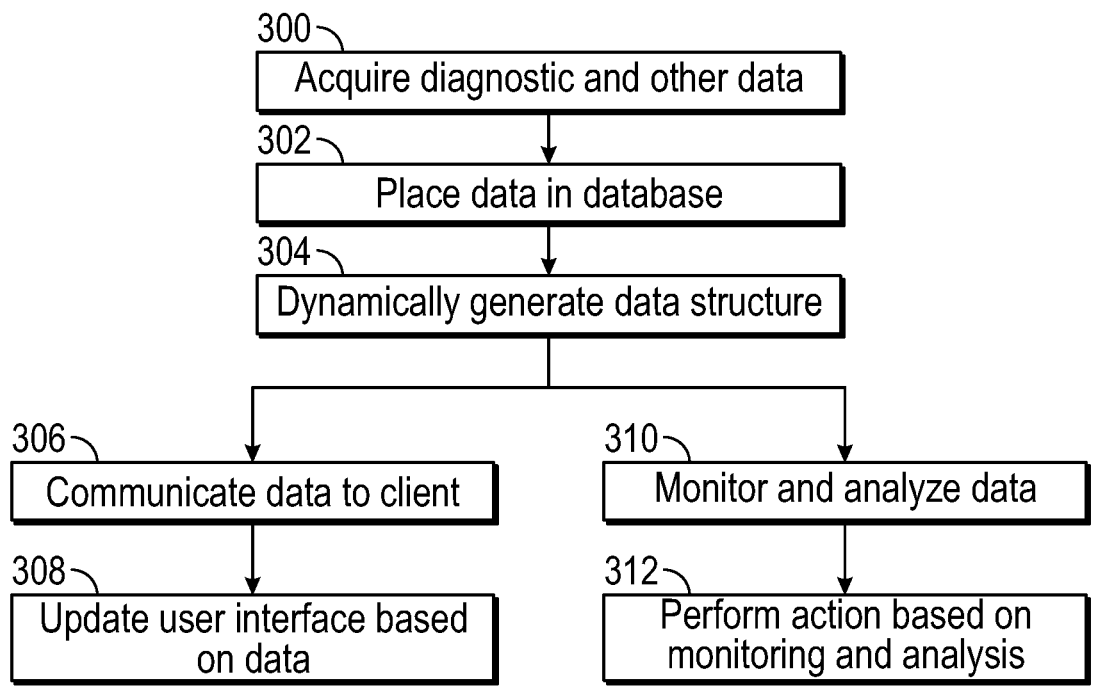
FIG. 11 is a flowchart of a method of gathering, monitoring, and displaying diagnostic and other data in accordance with an example embodiment of the disclosed concept.

FIG. 11 is a flowchart of a method of gathering and display or analyzing data associated with a railway system in accordance with an example embodiment of the disclosed concept. The method of FIG. 11 may be incorporated in conjunction with various embodiments of the disclosed concept such as those shown in FIGS. 1-4. The method begins at 300 where diagnostic and/or other data associated with field objects 102 and/or controllers 104 is acquired. In some embodiments, this step may be performed by the controllers 104, the data acquisition module 112, or a combination thereof. At 302, the gathered data is placed in the database 122 where it is stored. At 304, a data structure is dynamically generated. This step may be performed by the dynamic access module 124.

Once the data structure is dynamically generated, it may be accessed by a variety of devices or modules. In some example embodiments, the method proceed to 306 where the data is communicated to a client 108. Then, at 308, the user interface 200 of the client is updated based on the data. As described with respect to some embodiments, the update may include changing the look of display objects 206 based on the data.

In some example embodiments, the method proceeds from 304 to 310 where the data is monitored and analyzed, for example, by the monitoring and analysis module. In some example embodiments, as described herein, the data is analyzed using machine learning and patterns may be recognized based on the analyzed data to predict failure or service needs of field objects 102. In some example embodiments described herein, the data is monitored based on various criteria. As a result of the monitoring or analysis, the method proceed to 312 where an action is performed based on the monitoring or analysis. The action may be for example, an alarm or other indication output based on monitoring specified criteria or a work order being generated based on analysis indicating that a failure is upcoming or service is needed.

It will be appreciated that some example embodiments of the disclosed concept include steps 306 and 308, some example embodiments of the disclosed concept include steps 310 and 312, while some example embodiments of the disclosed concept include all of steps 306, 308, 310, and 312. While FIG. 11 illustrates a flowchart of one method of gathering and displaying or analyzing data according to the disclosed concept, it will be appreciated by those having ordinary skill in the art that various steps may be added, omitted, or modified without departing from the scope of the disclosed concept.

Figure 12:
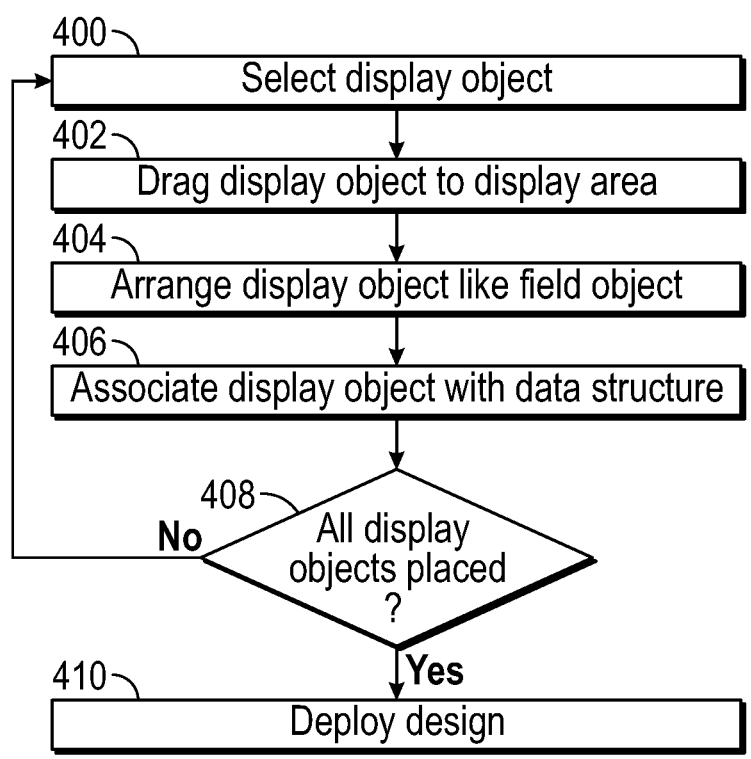
FIG. 12 is a flowchart of a method of creating a dynamic user interface in accordance with an example embodiment of the disclosed concept.

FIG. 12 is a flowchart of a method of designing a user interface in accordance with an example embodiment of the disclosed concept. In some example embodiments of the disclosed concept, the method of FIG. 12 may be applied to the client 108 in various embodiments described herein. The method begins at 400 where a display object 206 is selected in the display object area 204. At 402, the display object 206 is dragged to the display area 208. At 404, the display object 206 is arranged like the field object 102 it corresponds to. For example, the display object 206 is arranged with respect to other display objects 206 such that the display objects 206 are arranged like the field object 102 they are associated with. At 406, the display object 206 is associated with data included in the database 122. For example, the object association area 202 is used to select the data the display object 206 is associated with.

Once the display object 206 has been associated with data in the database 122, the method proceeds to 408. At 408, if not all of the display objects 206 that are intended to be included in the design have been placed, the method proceeds back to 400 where the next display object 206 is selected. Steps 400, 402, 404, and 406 are repeated until all display objects 206 that are intended to be included in the design are placed. Once all of the display objects 206 are places, the method proceeds from 408 to 410. At 410, the design is deployed. In this case, deployed can mean any manner in which the design of the user interface 200 is put into use. In some example embodiments, the design can be saved and distributed to clients 108 such that each of the clients 108 is able to display the same user interface or set of user interfaces.

Referring back to FIGS. 1-4, various arrangements of railway diagnostic systems 100, 100', 100", 100'" in accordance with embodiments of the disclosed concept are shown. It will be appreciated by those having ordinary skill in the art that the components of systems 100, 100', 100", 100'" may be arranged in various manners without departing from the scope of the disclosed concept. For example, in the system 100 of FIG. 1, the multiple controllers 104 are generally connected to the diagnostic server 106.

Figure 2:
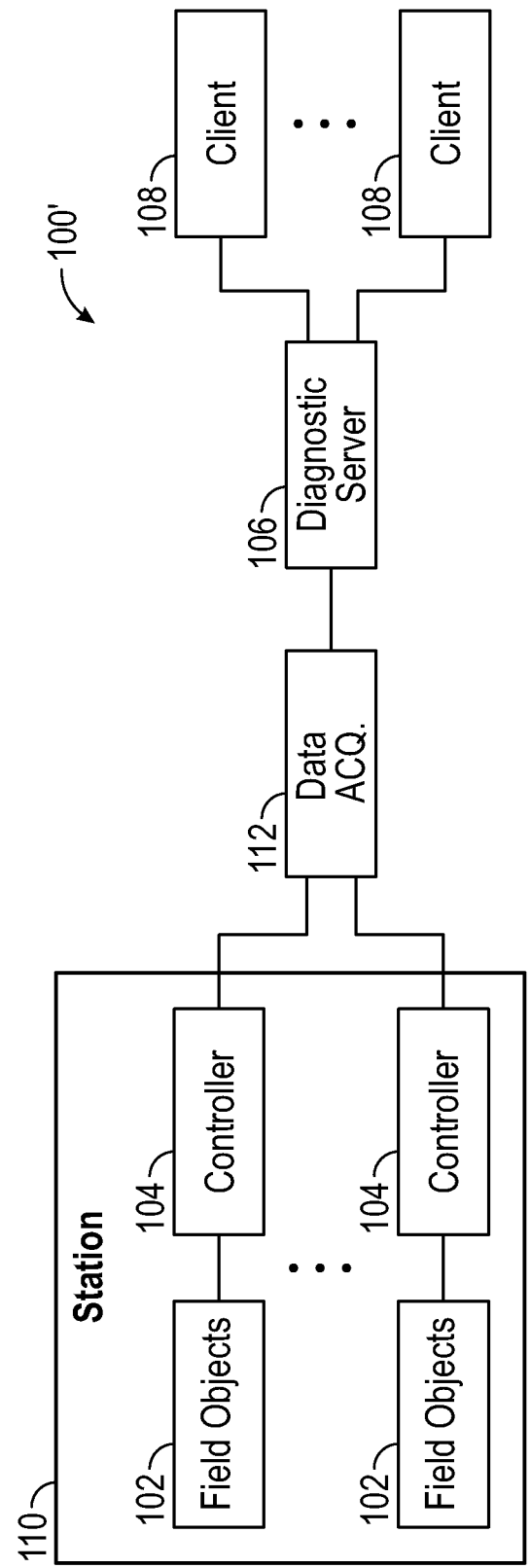
FIG. 2 is a schematic diagram of a railway diagnostic system in accordance with another example embodiment of the disclosed concept.

In the example embodiment shown in FIG. 2, multiple controllers 104 are located in the same station 110. The controller 104 in the station 110 are associated with a data acquisition module 112, which is associated with the diagnostic server 106. It will be appreciated that the embodiment of FIG. 2 may also be modified by incorporating the data acquisition module 112 into the diagnostic server 106 without departing from the scope of the disclosed concept.

Figure 3:
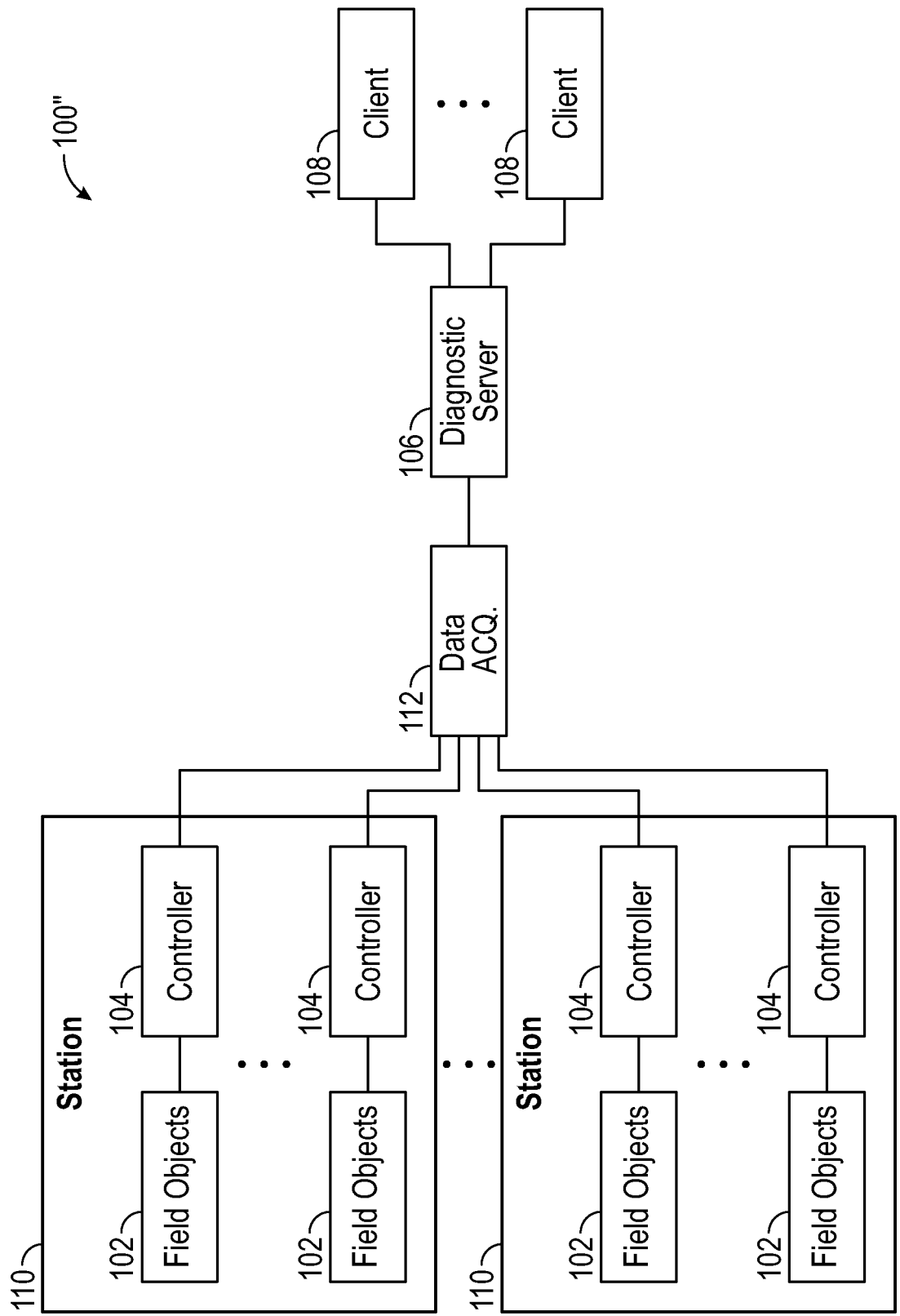
FIG. 3 is a schematic diagram of a railway diagnostic system in accordance with another example embodiment of the disclosed concept.

In the example embodiment shown in FIG. 3, multiple controllers 104 are located in the same station 110 and multiple stations 110 are provided. All of the controllers 104 are associated with a data acquisition module 112 which is associated with a diagnostic server 106. In this manner, data from controllers 104 at multiple stations is aggregated to the diagnostic server 106. It will also be appreciated that the data acquisition module 112 may be incorporated into the diagnostic server without departing from the scope of the disclosed concept.

Figure 4:
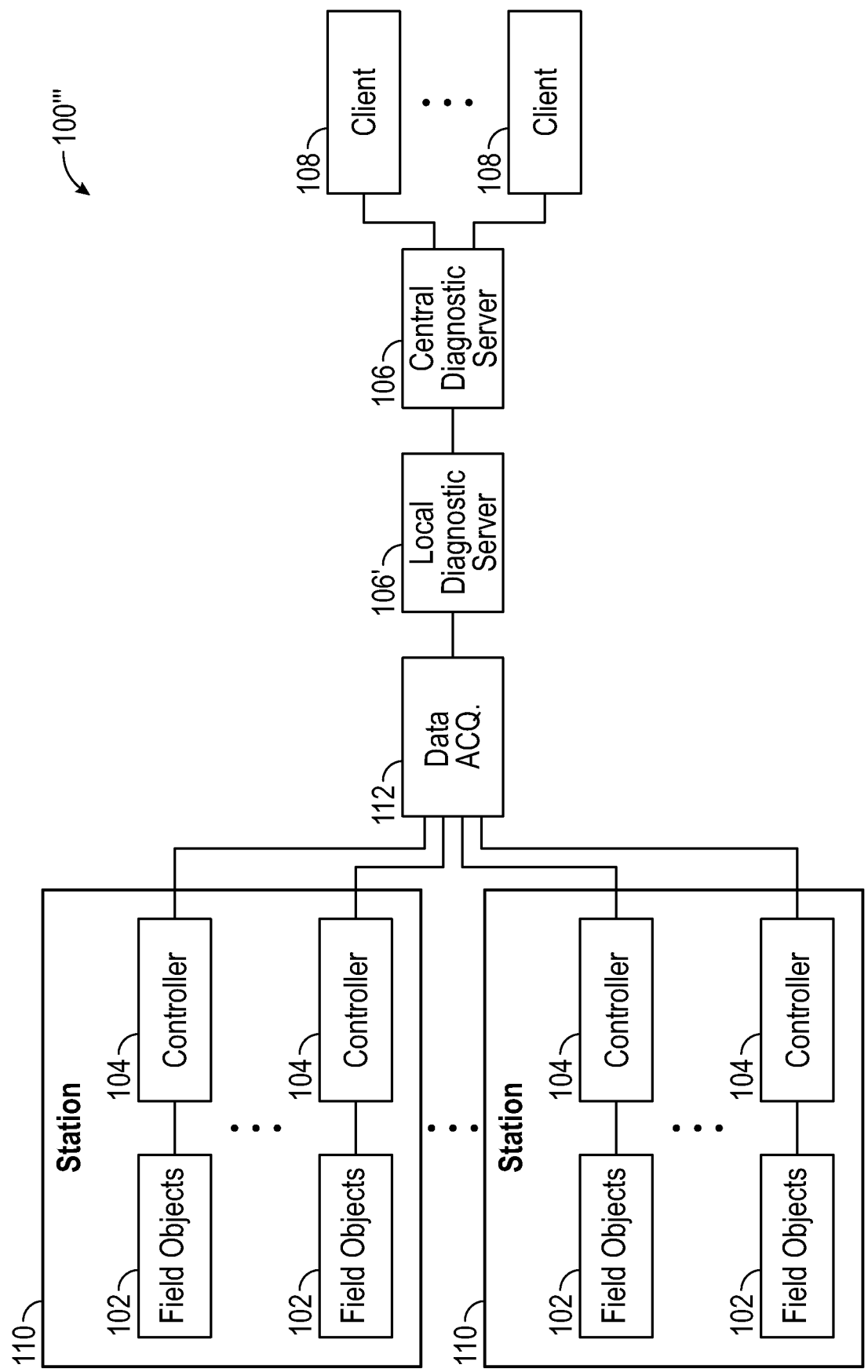
FIG. 4 is a schematic diagram of a railway diagnostic system in accordance with another example embodiment of the disclosed concept.

In the example embodiments shown in FIG. 4, multiple controllers 104 are located in the same station 110 and multiple stations 110 are provided, like in the embodiment of FIG. 3. However, in the embodiment of FIG. 4, a local diagnostic server 106' is provided that is associated with a central diagnostic server 106. The local diagnostic server 106' may provide much of the functionality of the central diagnostic server 106. For example, the local diagnostic server 106' may acquire data and provide it for display to clients or analyze the acquired data. However, multiple local diagnostic servers 106' may be provided, each associated with one station 110 or a set of stations 110. The central diagnostic server 106 may aggregate data from all of the local diagnostic servers 106' in the system 100'". In this manner, each of the local diagnostic servers 106' may maintain their own databases 122. The local diagnostic servers 106' may continue to be used even in the event of a failure of the central diagnostic server 106 or other local diagnostic servers 106'.

As shown in FIGS. 1-4, various arrangements of railway diagnostic systems may be provided without departing from the scope of the disclosed concept. While FIGS. 1-4 provide four example embodiments, it will be appreciated that components shown in the example embodiments may be added to, modified, or rearranged in various manners without departing from the scope of the disclosed concept.

One or more aspects of the disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A railway diagnostic system comprising:
a plurality of field objects;
a plurality of controllers associated with field objects and being structured to gather data from the field objects and to communicate the data gathered from the field objects;
a diagnostic server structured to receive the data gathered from the field objects from at least one of the plurality of controllers, to store the data gathered from the field objects in a database, and to provide access to the database; and
a client structured to use the diagnostic server to access the database and to display a representation of data accessed in the database,
wherein at least one of the plurality of controllers includes a vital module and a non-vital module, wherein the vital module is structured to control safety related functionality and the non-vital module is structured to control non-safety related functionality.

2. The railway diagnostic system of claim 1, wherein the diagnostic server is structured to monitor or analyze the data stored in the database.

3. The railway diagnostic system of claim 2, wherein the diagnostic server is structured to monitor the data stored in the database and to output an indicator when the data stored in the database meets a predetermined criteria.

4. The railway diagnostic system of claim 2, wherein the diagnostic server is structured to analyze the data in the database using machine learning to determine potential failure or service criteria and to automatically generate a work order based on the data in the database indicating a potential failure or service need.

5. The railway diagnostic system of claim 1, wherein the field objects and controllers are distributed across geographic locations and the diagnostic server is centrally located.

6. The railway diagnostic system of claim 1, wherein the client is structured to generate a user interface including one or more display objects associated with the data accessed in the database, and wherein the client is structured to update the display objects based on the data accessed in the database.

7. The railway diagnostic system of claim 6, wherein the display objects are associated with field objects, and wherein the display objects emulate a look of their associated field objects.

8. The railway diagnostic system of claim 1, wherein the diagnostic server is structured to provide the data gathered from the field objects to at least one of the plurality of controllers.

9. The railway diagnostic system of claim 1, wherein the diagnostic server is structured to store the data gathered from the field objects for a predetermined period of time in the database, and wherein the client is structured to use the diagnostic server to access the database to access the data gathered from the field objects for the predetermined period of time and to display the representation of the data gathered from the field objects for the predetermined period of time.

10. The railway diagnostic system of claim 1, wherein the client is structured to generate the user interface to display the representation of the data accessed in the database.

11. The railway diagnostic system of claim 10, wherein the user interface includes a display object area, a display area, and an object association area, wherein the display object area is structured to display a plurality of display objects, the display area is structured to display a selected one or more of the plurality of the display objects, and the objection association area is structured display data from the field objects and to allow a user to associate selected data from the field objects with the selected one or more of the plurality of display objects.

12. The railway diagnostic system of claim 11, wherein the user interface is structured to allow the user to move one or more of the plurality of display objects from the display object area to one or more selected locations in the display area.

13. The railway diagnostic system of claim 11, wherein the user interface is structured to allow the user to select data from the field objects in the objection association area and to select the selected one or more of the plurality of the display objects displayed in the display area to associate selected data from the field objects with the selected one or more of the plurality of display objects.

14. The railway diagnostic system of claim 1, wherein the diagnostic server is structured to dynamically generate the database based on the data gathered from the field objects.

15. The railway diagnostic system of claim 1, further comprising:
a data acquisition module structured to receive the data gathered from the field objects from the plurality of controllers and to provide the data gathered from the field objects to the diagnostic server.

16. The railway diagnostic system of claim 1, wherein the diagnostic server is structured to synchronize time with the plurality of controllers.

17. The railway diagnostic system of claim 1, wherein at least one of the plurality of controllers is structured to gather diagnostic data about itself and to communicate the diagnostic data to the diagnostic server, wherein the diagnostic server is structured to receive the diagnostic data and to store diagnostic data in the database, and wherein the client is structured to display a representation of diagnostic data.

18. A method of gathering and displaying or analyzing data in a railway diagnostic system, the method comprising:
gathering data from a plurality of field objects with a plurality of controllers associated with the plurality of field objects, wherein at least one of the plurality of controllers includes a vital module and a non-vital module, wherein the vital module is structured to control safety related functionality and the non-vital module is structured to control non-safety related functionality;
storing the gathered data in a database;
providing access to the database;
accessing the data in the database; and
displaying a representation of data accessed in the database.

19. A non-transitory computer readable medium storing one or more programs, including instructions, which when executed by a computer, causes the computer to perform a method of gathering and displaying or analyzing data in a railway diagnostic system, the method comprising:
gathering data from a plurality of field objects with a plurality of controllers associated with the plurality of field objects, wherein at least one of the plurality of controllers includes a vital module and a non-vital module, wherein the vital module is structured to control safety related functionality and the non-vital module is structured to control non-safety related functionality;
storing the gathered data in a database;
providing access to the database;
accessing the data in the database; and
displaying a representation of data accessed in the database.

* * * * *